United States Patent [19]
Nose

[11] Patent Number: 5,180,965
[45] Date of Patent: Jan. 19, 1993

[54] DIRECT-CURRENT POWER SOURCE CIRCUIT WITH BACK GATE CONTROL CIRCUIT FOR POWER MOS-FET

[75] Inventor: Tadashi Nose, Shiga, Japan
[73] Assignee: NEC Corporation, Tokyo, Japan
[21] Appl. No.: 782,318
[22] Filed: Oct. 24, 1991

[30] Foreign Application Priority Data

Oct. 25, 1990 [JP] Japan .................................. 2-290067

[51] Int. Cl.$^5$ ........................................... G05F 1/565
[52] U.S. Cl. ................... 323/275; 323/279; 323/303
[58] Field of Search ............... 323/273, 274, 275, 276, 323/303, 279

[56] References Cited

FOREIGN PATENT DOCUMENTS

| 3716880 | 12/1988 | Fed. Rep. of Germany . | |
|---|---|---|---|
| 106013 | 6/1984 | Japan | 323/273 |
| 69719 | 4/1985 | Japan | 323/273 |
| 1-83715 | 7/1989 | Japan . | |
| 1403051 | 6/1988 | U.S.S.R. . | |

Primary Examiner—William H. Beha, Jr.

[57] ABSTRACT

A direct current power source circuit has a voltage control power MOS-FET and a back gate control circuit. The voltage control power MOS-FET is connected between an input terminal and an output terminal of the circuit and the back gate control circuit is connected to a back gate of the voltage control power MOS-FET and controls a back gate voltage for causing a parasitic diode between a source and a drain of the power MOS-FET to become a non-conductive state when an input voltage applied to the input terminal becomes a low level. The output of the back gate control circuit is also connected to a voltage dividing circuit which sets an output voltage of the power source circuit. The arrangement enables to prevent a reverse flow of current from the output terminal to the input terminal.

4 Claims, 1 Drawing Sheet

DIRECT-CURRENT POWER SOURCE CIRCUIT WITH BACK GATE CONTROL CIRCUIT FOR POWER MOS-FET

BACKGROUND OF THE INVENTION (1) The Field of the Invention

The present invention relates to a direct current power source circuit and, more particularly, to a direct current power source circuit equipped with a series control device consisting of a voltage control power MOS-FET provided between an input terminal and an output terminal of the circuit.

(2) Description of the Related Art

A conventional direct current power source circuit using, for example, an N-channel power MOS-FET will be described below with reference to FIG. 1.

In FIG. 1, a voltage control power MOS-FET Q1 has a drain connected to an input terminal 2 and a source connected to an output terminal 3. It should be noted that a back gate of the power MOS-FET Q1 is connected to the source thereof. In FIG. 1, the reference numeral 4 represents a charge pump which is connected to a gate of the power MOS-FET Q1; Q5 represents a control output amplifying transistor of an N-channel MOS-FET whose drain is connected to a gate of the power MOS-FET Q1 and whose source is connected to a ground terminal 6; 7 and 8 represent voltage dividing resistors connected in series for setting an output voltage which are provided between the source of the power MOS-FET Q1 and the ground terminal 6; and 9 represents a differential amplifier for amplifying an error voltage, one input terminal (−) of which is connected to a reference voltage source 10 for supplying a reference voltage $V_{REF}$, the other input terminal (+) of which is connected to an intermediate connection node a of the voltage dividing resistors 7 and 8, and an output terminal of which is connected to a gate of the control output amplifying MOS-FET Q5.

The operation of the conventional direct current power source circuit as arranged above is as follow. If an input voltage $V_{IN}$ applied to the input terminal 2 becomes a high level, the charge pump 4 operates to increase the gate voltage of the power MOS-FET Q1 to a voltage level higher than the input voltage $V_{IN}$, whereby the power MOS-FET Q5 is turned to its ON state. As a result, at the output terminal 3, there is obtained an output voltage $V_{OUT}$. At this time, the control output amplifying MOS-FET Q5 is operated in response to the output of the differential amplifier 9 on the basis of the reference voltage $V_{REF}$ of the reference voltage source 10, whereby the output voltage $V_{OUT}$ becomes proportional to the voltage dividing ratio of the voltage dividing resistors 7 and 8.

In the direct current power source circuit having circuit arrangements as above, however, if such a state wherein the input voltage $V_{IN}$ becomes lower than the output voltage $V_{OUT}$ resulting from a momentary voltage-off or voltage drop of the input voltage for any reason arises, a parasitic diode inherently existing between the source and drain of the power MOS-FET Q1 is electrically made conductive, so that a current will flow reversely, that is, from the output terminal 3 to the input terminal 2. In this case, if a memory backup circuit for supplying a backup voltage to a memory when the power source undergoes a momentary voltage-off for any reason is connected to the output terminal 3, the backup power charged in a secondary cell or a capacitor of the backup circuit is discharged by the reverse flow of the current caused by the parasitic diode as explained above, which leads to a problem that the backup voltage will be lowered. In addition, since the current also flows in the voltage dividing resistors 7 and 8, the backup voltage will further be lowered.

SUMMARY OF THE INVENTION

In consideration of the above-mentioned problems, the circuit of this invention is proposed, and an object of this invention is to provide a direct current power source circuit in which a parasitic diode inherently existing between a source and drain of the voltage control power MOS-FET is prevented from being electrically conducted thereby preventing a reverse flow of current from the output terminal to the input terminal of the circuit when the input voltage has momentarily been cut off.

According to one aspect of the invention, there is provided a direct current power source circuit having an input terminal and an output terminal comprising:
 a voltage control power MOS-FET as a series control device provided between the input terminal and the output terminal of the circuit, and
 a back gate control circuit which is connected to a back gate of the power MOS-FET and which controls a back gate voltage for causing a parasitic diode between a source and a drain of the power MOS-FET to become a non-conductive state when an input voltage applied to the input terminal becomes a low level.

According to another aspect of the invention, the back gate control circuit has a two-stage inverter circuit which is formed by a first stage inverter circuit and a second stage inverter circuit, the first stage inverter having an input node connected to the voltage input terminal and the second stage inverter circuit having an output node connected to the back gate of the power MOS-FET and also to one end of the voltage dividing resistors for setting the output voltage.

In the direct current power source circuit according to the present invention, the back gate control circuit is connected to the back gate of the power MOS-FET and controls the back gate voltage thereof so as to cause the parasitic diode between the source and drain of the power MOS-FET to become non-conductive when the input voltage is at the low level. As a result, even when the input voltage becomes the low level due to a momentary voltage-off or voltage drop of the power source for any reason, the back gate voltage of the power MOS-FET can be set to a low level by the back gate control circuit, and the parasitic diode in the power MOS-FET is made non-conductive, so that a reverse flow of current from the output terminal to the input terminal can be effectively prevented.

Also, in the circuit wherein the back gate control circuit has the two-stage inverter circuit which is connected to the input terminal of the circuit and whose second stage inverter circuit is connected to the back gate of the power MOS-FET and also to one of the voltage dividing resistors for setting the output voltage, the other being connected to the ground terminal, the flow of current into the voltage dividing resistors can also be prevented.

BRIEF DESCRIPTION OF THE DRAWINGS

The above and other objects, features and advantages of the present invention will be apparent from the following description of a preferred embodiment of the invention explained with reference to the accompanying drawings, in which.

DESCRIPTION OF THE PREFERRED EMBODIMENT

Figure 1:
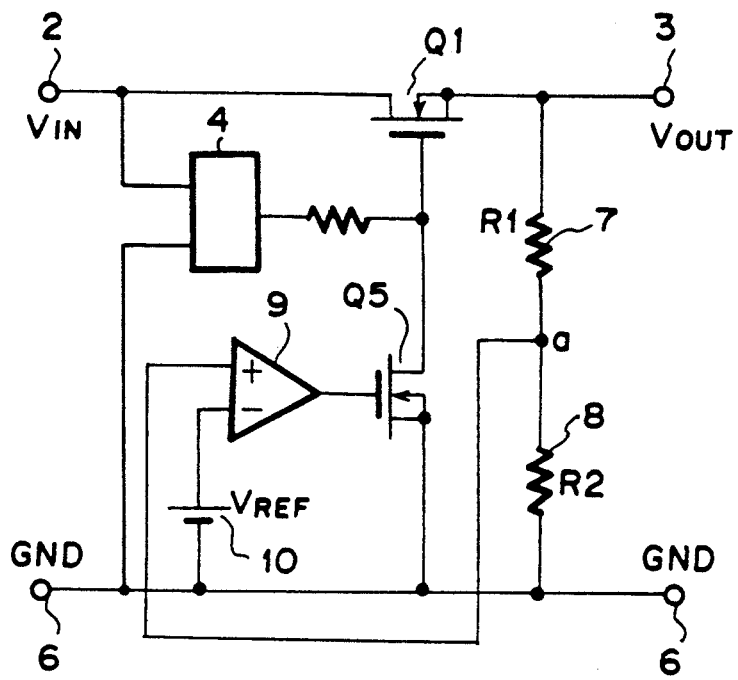
FIG. 1 is a circuit diagram of a direct current power source circuit of the prior art.

Now, one embodiment of the invention will be explained with reference to FIG. 2 which diagrammatically shows a direct current power source circuit according to the invention. Where the same reference symbols or numerals as in FIG. 1 are used for the same elements in FIG. 2, their explanations will generally be omitted herein.

Figure 2:
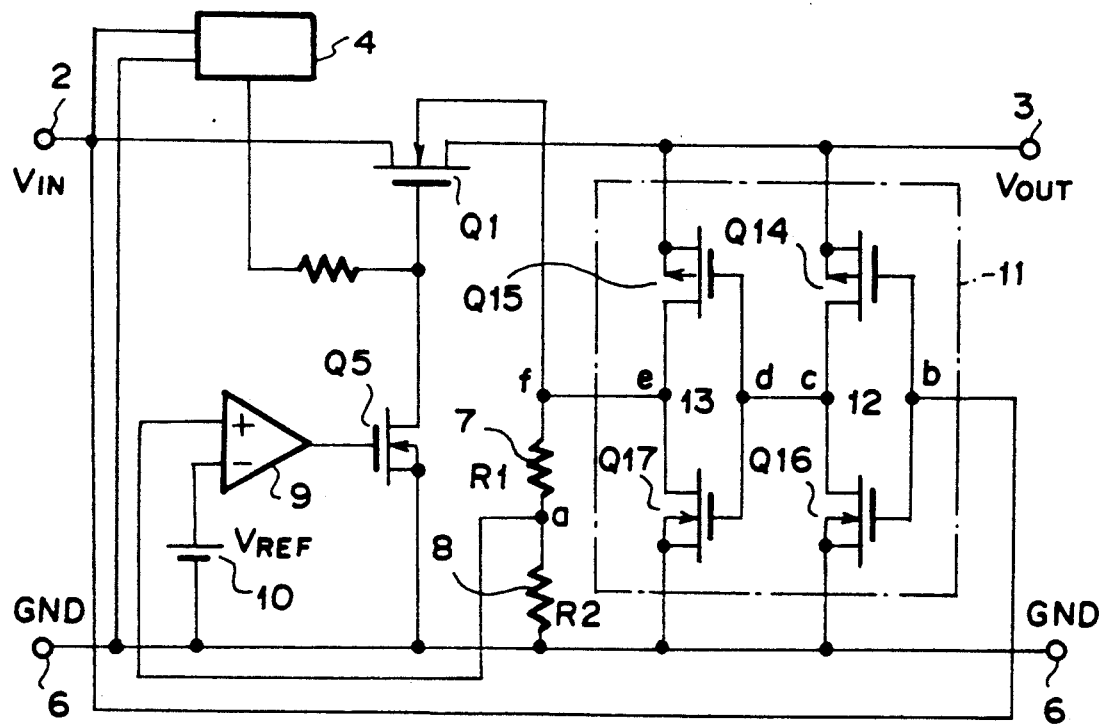
FIG. 2 is a circuit diagram of a direct current power source circuit of one embodiment according to the invention.

The circuit of this embodiment features that a back gate control circuit 11 is provided which is, as shown in FIG. 2, connected to the back gate of the voltage control power MOS-FET Q1 and which controls the back gate voltage so as to cause a parasitic diode between the source and drain of the power MOS-FET Q1 to become non-conductive when the input voltage $V_{IN}$ becomes a low level.

Specifically, the back gate control circuit 11 comprises a two-stage inverter circuit which is formed by a first stage inverter circuit 12 whose input is connected to the input terminal 2 and a second stage inverter circuit 13 whose output is connected to the back gate of the power MOS-FET Q1 and also to one end of the serially connected voltage dividing resistors 7 and 8 for setting the output voltage $V_{OUT}$. The primary difference of the circuit according to the invention from the conventional circuit shown in FIG. 1 is that the back gate of the power MOS-FET Q1 is isolated or separated from the source thereof and is connected to an output node of the second stage inverter circuit 13. More specifically, the first stage inverter circuit 12 comprises a P-channel MOS-FET Q14 and an N-channel MOS-FET Q16, and the second stage inverter circuit 13 comprises a P-channel MOS-FET Q15 and an N-channel MOS-FET Q17. In the first stage inverter circuit 12, the gate of the P-channel MOS-FET Q14 and the gate of the N-channel MOS-FET Q16 are connected in common, thereby forming an input node b which is connected to the input terminal 2 of the power source circuit. Further, the drain of the P-channel MOS-FET Q14 and the drain of the N-channel MOS-FET Q16 are connected in common, thereby forming an output node c of the first stage inverter circuit 12. The source of the P-channel MOS-FET Q14 is connected to the source of the power MOS-FET Q1, and the source of the N-channel MOS-FET Q16 is connected to the ground terminal 6. On the other hand, in the second stage inverter circuit 13, the gate of the P-channel MOS-FET Q15 and the gate of the N-channel MOS-FET Q17 are connected in common, thereby forming an input node d of the second stage inverter circuit 13, which is connected to the output node c of the first stage inverter circuit 12. The drain of the P-channel MOS-FET Q15 and the drain of the N-channel MOS-FET Q17 are connected in common, thereby forming an output node e of the second stage inverter circuit 13. The output node e of the second inverter circuit 13 is connected to a connection node f which is connected to the back gate of the power MOS-FET Q1 and one end of the voltage dividing resistor 7. The source of the P-channel MOS-FET Q15 is connected to the source of the power MOS-FET Q1, and the source of the N-channel MOS-FET Q17 is connected to the ground terminal 6.

Next, operation of the direct current power source circuit having the back gate control circuit of the invention will be explained hereinafter. If the input voltage $V_{IN}$ applied to the input terminal 2 becomes the high level, a charge pump 4 operates to increase the gate voltage of the power MOS-FET Q1 to a level higher than that of the input voltage $V_{IN}$, so that the power MOS-FET Q1 is turned ON. As a result, there is obtained the output voltage $V_{OUT}$ at the output terminal 3. At this time, the output of the differential amplifier 9 for amplifying an error voltage on the basis of the reference voltage $V_{REF}$ of the reference voltage source 10 is amplified by the control output amplifying MOS-FET Q5, and the control voltage thus obtained drives the gate of the power MOS-FET Q1, so that the output voltage $V_{OUT}$ which is proportional to the voltage dividing ratio of the voltage dividing resistors 7 and 8 can be obtained at the output terminal 3.

With the direct current power source circuit according to this embodiment, even if the power source undergoes a momentary voltage-off or voltage drop for any reason and the input voltage $V_{IN}$ applied to the input terminal 2 becomes lower than the output voltage $V_{OUT}$ and thus becomes the low level, the voltage of the back gate of the power MOS-FET Q1 is retained at the low level by the back gate control circuit 11 formed by the first and second inverter circuits 12 and 13. Detailed operation is as follows.

Since the input terminal 2 is connected to the input node b of the first stage inverter circuit 12, according to the low level at the input terminal 2, hence the low level of the respective gates of the P-channel MOS-FET Q14 and the N-channel MOS-FET Q16 of the first stage inverter circuit 12, the P-channel MOS-FET Q14 is turned ON but the N-channel MOS-FET Q16 is turned OFF, so that the output node c of the first stage inverter circuit 12 becomes the high level. As a result, the gate voltage of the P-channel MOS-FET Q15 and the N-channel MOS-FET Q17 of the following second stage inverter circuit 13 become the high level, and the P-channel MOS-FET Q15 is turned OFF and the N-channel MOS-FET Q17 is turned ON, respectively, so that the output node e of the second stage inverter circuit 13 becomes the low level. Accordingly, the potential at the node f which is the connection point between the back gate of the power MOS-FET Q1 and the voltage dividing resistor 7 becomes the low level, so that the back gate voltage of the power MOS-FET Q1 is retained at the low level. As a result, the parasitic diode between the source and drain of the power MOS-FET Q1 is never electrically conducted and thus no reverse flow of current from the output terminal 3 to the input terminal 2 occurs. Therefore, even where a memory backup circuit for supplying a backup voltage to a memory when the power source breaks down for any reason is connected to the output terminal 3, there is no possibility for the backup voltage to be lowered due to consumption of the backup power charged in a secondary cell or a capacitor of the backup circuit.

In addition, since the potential at the connection point f of the back gate of the power MOS-FET Q1 and the voltage dividing resistor 7 becomes the low level, there is no flow of current to the voltage dividing resistors 7 and 8, either, which means that the prevention of lowering of the backup voltage due to consumption can be more definitely ensured.

With the direct current power source circuit in accordance with this invention, when the input voltage becomes the low level due to a momentary voltage-off of the power source for any reason, the back gate voltage of the power MOS-FET can be set to the low level by the back gate control circuit. As a result, the parasitic diode between the source and drain of the power MOS-FET is never electrically conducted, and the reverse flow of current from the output terminal to the input terminal can be definitely prevented. Particularly, in a case where a memory backup circuit is connected to the output terminal, the prevention of lowering of the backup voltage contributes in making a large improvement in backup performance.

Also, since there is no flow of current to the voltage dividing resistors, the prevention of lowering of the backup voltage due to the consumption of the backup power can be more firmly ensured, resulting in a larger improvement in backup performance.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. A direct current power source circuit having an input terminal, an output terminal and a ground terminal, said circuit comprising:
   a voltage control power MOS-FET as a series control device provided between said input terminal and said output terminal of the circuit, and
   a back gate control circuit which is connected to a back gate of said power MOS-FET and which controls a back gate voltage for causing a parasitic diode between a source and a drain of said power MOS-FET to become a non-conductive state when an input voltage applied to said input terminal becomes a low level.

2. A direct current power source circuit according to claim 1, in which said voltage control power MOS-FET is of an N-channel type.

3. A direct current power source circuit according to claim 1, in which said back gate control circuit comprises:
   a two-stage inverter circuit which is formed by a first stage inverter circuit and a second stage inverter circuit, said first stage inverter circuit having an input node connected to said input terminal and said second stage inverter circuit having an output node connected to the back gate of said power MOS-FET; and
   a voltage dividing circuit for setting an output voltage, which is connected between the back gate of said power MOS-FET and said ground terminal.

4. A direct current power source circuit according to claim 3, in which each of said first and second stage inverter circuits comprise a complementary pair of a P-channel MOS-FET and an N-channel MOS-FET, with gates of said P-channel and N-channel MOS-FETs being connected with each other to form an input node, with drains of said P-channel and N-channel MOS-FETs being connected with each other to form an output node, with a source of said P-channel MOS-FET being connected to the source of said power MOS-FET, and a source of said N-channel MOS-FET being connected to said ground terminal, respectively.

* * * * *